(12) United States Patent  (10) Patent No.: US 8,333,404 B2
Moster  (45) Date of Patent: Dec. 18, 2012

(54) SHOPPING CART WITH ASSEMBLY FOR VEHICLE STORAGE

(76) Inventor: Chaim Moster, Brooklyn, NY (US)

( * ) Notice: Subject to any disclaimer, the term of this patent is extended or adjusted under 35 U.S.C. 154(b) by 432 days.

(21) Appl. No.: 12/684,980

(22) Filed: Jan. 11, 2010

(65) Prior Publication Data

US 2011/0169235 A1  Jul. 14, 2011

(51) Int. Cl.
*B62B 3/02* (2006.01)
(52) U.S. Cl. ............... 280/651; 280/38; 280/33.991
(58) Field of Classification Search ............ 280/38, 280/35, 639, 651, 654, 655, 43, 47.34, 33.991, 280/33.995
See application file for complete search history.

(56) References Cited

U.S. PATENT DOCUMENTS

| | | | | |
|---|---|---|---|---|
| 3,223,429 A | * | 12/1965 | Hastings | 280/641 |
| 3,804,431 A | * | 4/1974 | Robinson | 280/645 |
| 4,192,541 A | * | 3/1980 | Ferneau | 296/20 |
| 4,887,836 A | * | 12/1989 | Simjian | 280/651 |
| 5,289,936 A | * | 3/1994 | Jones et al. | 220/4.28 |
| 5,649,718 A | * | 7/1997 | Groglio | 280/641 |
| 6,045,150 A | * | 4/2000 | Al-Toukhi | 280/641 |
| 6,070,899 A | * | 6/2000 | Gines | 280/651 |
| 6,575,491 B2 | * | 6/2003 | Miller | 280/638 |
| 6,916,028 B2 | * | 7/2005 | Shapiro | 280/47.34 |

FOREIGN PATENT DOCUMENTS

| | | | |
|---|---|---|---|
| DE | 196 11 542 A1 | * | 9/1997 |
| FR | 2 775 645 | * | 9/1999 |
| JP | 4-11558 | * | 1/1992 |

* cited by examiner

*Primary Examiner* — Frank Vanaman
(74) *Attorney, Agent, or Firm* — Mark M. Friedman

(57) ABSTRACT

A shopping cart has a basket having left and right sides, a floor, a rear wall and a front wall and has a handlebar. Squeezing the handlebar and moving it down causes a front wheel assembly to rotate from a down position in which the front wheels contact the ground toward a storage position in which the front wheels are positioned adjacent or above the floor. A rear wheel assembly is rotatable from a down position in which the rear wheels contact the ground to a storage position in which the rear wheels are positioned at or behind the rear wall. After positioning the loaded shopping cart adjacent a trunk vehicle, slide the cart and rotate the front and rear wheel assemblies, which may be lockable, to get the cart into the trunk for storage during transportation home. Reverse the process once home. The cart basket collapses into two dimensions for closet storage.

6 Claims, 18 Drawing Sheets

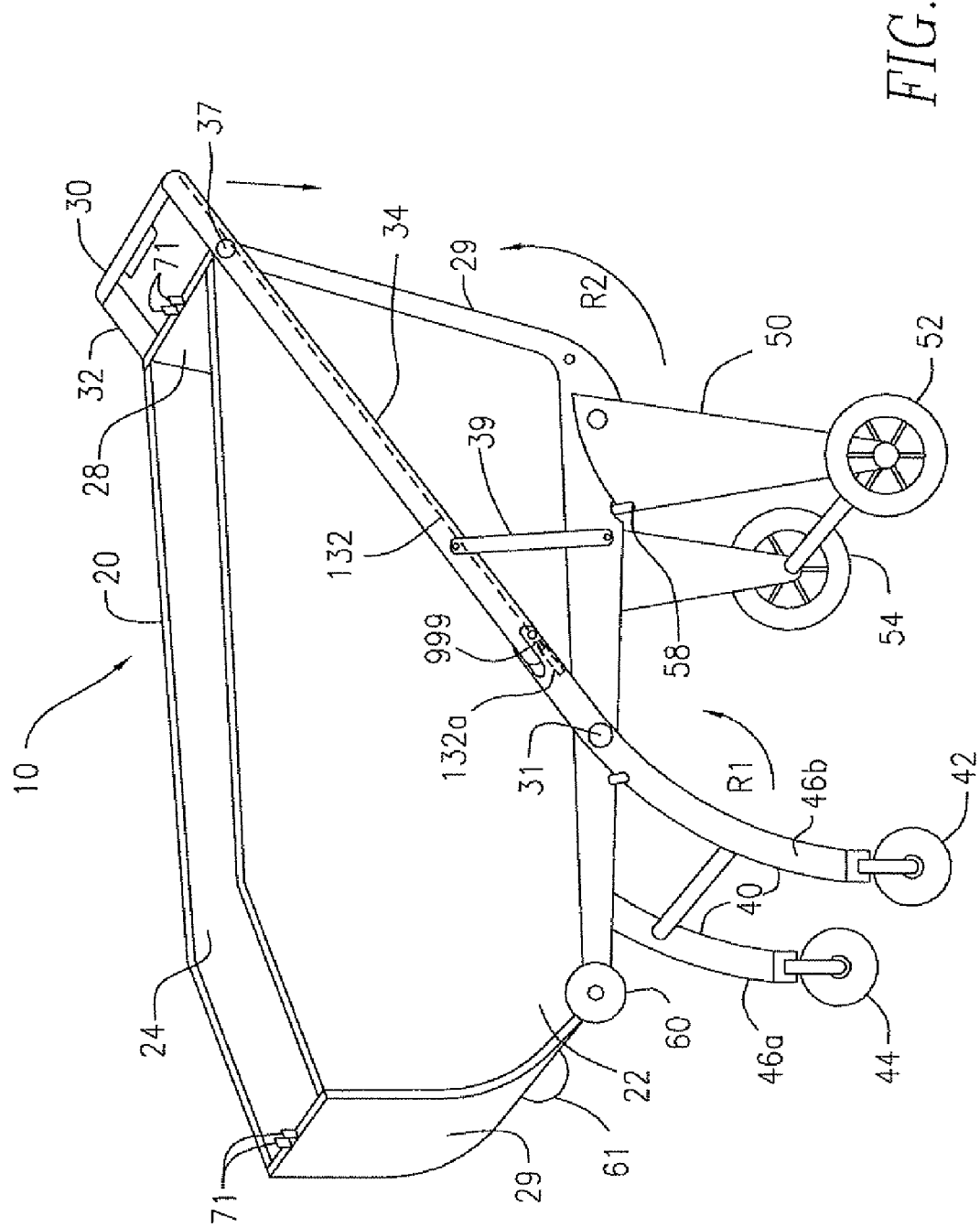

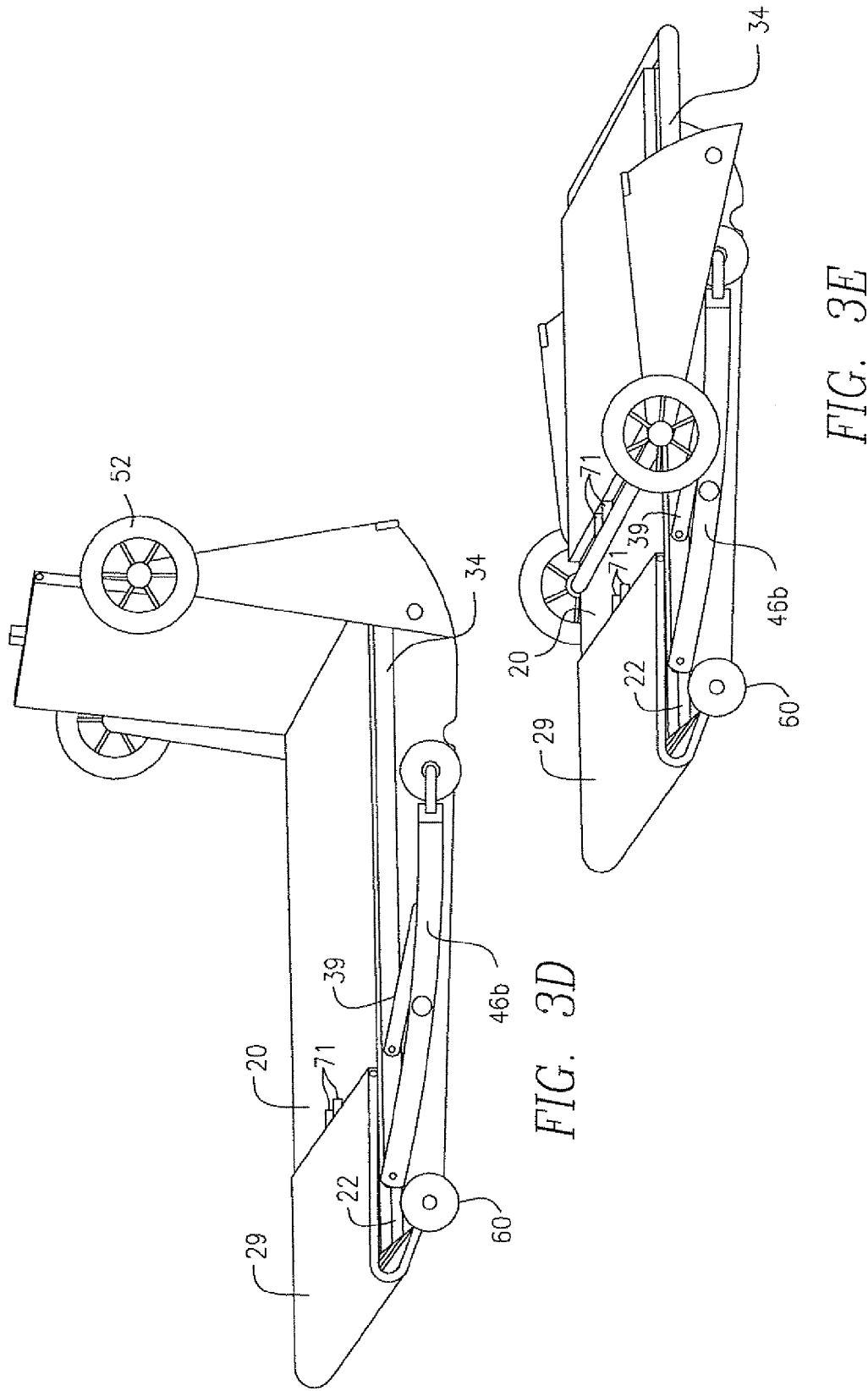

SHOPPING CART WITH ASSEMBLY FOR VEHICLE STORAGE

BACKGROUND OF THE INVENTION

The present invention generally relates to apparatus and methods for shopping carts and, more particularly, for apparatuses and methods that allow shopping carts to be stored easily in vehicle trunks.

Shoppers, particularly shoppers who make large purchases for their large families, typically wheel the shopping cart to the car and unpack the contents into the trunk of the car. This is time consuming and difficult and could lead to damage to some of the purchased items. Moreover, the same effort and time is called upon when unloading the content of the car trunk and transporting the purchased items into the house when arriving home. The combination of the two transfers is doubly difficult and time consuming.

Prior art attempts to solve this problem are not effective in eliminating the necessary multiple motions of the shopper.

As can be seen, there is a need for an easier cost effective and practical apparatus and method for transferring large amounts of purchased groceries into and out of vehicles in a secure way without accidentally spilling the contents of the cart. There is a further need for such an apparatus and/or method that minimizes the motions needed to be taken by the shopper to effectuate the transfers of the groceries.

SUMMARY OF THE PRESENT INVENTION

In one aspect of the present invention, there is presented a shopping cart, comprising a basket having sides, a floor, a rear wall and a front wall; a front wheel assembly including a left front wheel and a right front wheel, the front wheel assembly rotatable from a down position in which the front wheels contact a ground to a storage position in which the front wheels are positioned adjacent or above the floor; a handlebar having a projecting member and squeezable to move an internal crossbar of the handlebar toward a user, the internal crossbar connected to at least one movable rod of a right and/or left lever on a right and/or left side of the handlebar, the right and left levers connected to the front wheel assembly; and a rear wheel assembly rotatable from a down position in which the rear wheels contact the ground to a storage position in which the rear wheels are positioned at or behind the rear wall.

In a further aspect of the invention, there is presented a method, comprising squeezing a handlebar of a shopping cart having a basket, the basket including a floor and a rear wall, a front wheel assembly of the shopping cart including front wheels and a rear wheel assembly of the shopping cart including rear wheels; moving the handlebar downward to rotate the front wheels from a down position in which the front wheels contact a ground toward a storage position in which the front wheels are positioned adjacent or above the floor of the basket; positioning the shopping cart onto a floor of a vehicle trunk so that a portion of the floor of the basket forward of the front wheel assembly rests on the floor of the vehicle trunk; sliding the basket further into the trunk past a point at which a front of the front wheel assembly bumps into a rear of the vehicle; rotating the front wheel assembly further to the storage position in which the front wheels are positioned adjacent or above the floor of the basket; moving the shopping cart so that the baskets slides further into the trunk; and rotating the rear wheel assembly from a down position in which the rear wheels contact the ground to a storage position in which the rear wheels are positioned at or behind the rear wall.

In a further aspect of the present invention, there is presented a method, comprising loading a shopping cart that has a basket that includes a floor, a rear wall, a front wall, a handlebar and a front and rear wheel assembly; positioning the shopping cart onto a floor of a vehicle trunk so that a portion of the floor of the basket forward of the front wheel assembly rests on the floor of the vehicle trunk; sliding the basket into the trunk near a point at which a front of the front wheel assembly contacts a rear of the vehicle; by squeezing the handlebar and moving the handlebar down and forward rotating the front wheel assembly from a down position in which the front wheels contact a ground towards a storage position in which the front wheels are positioned adjacent or above the floor of the basket; sliding the basket further into the trunk; and rotating the rear wheel assembly from a down position in which the rear wheels contact the ground to a storage position in which the rear wheels are positioned at or behind the rear wall.

In a still further aspect of the present invention, there is presented a shopping cart, comprising a basket having a floor and a rear wall; a handlebar, the handlebar connected to a right lever on a right side of the handlebar and to a left lever on a left side of the handlebar, a front wheel assembly rotatable from a down position to a storage position and including right and left frame members that extend and connect to a forward end of the right and left levers respectively and that pivot on right and left frame fulcrums affixed to the basket; a rear wheel assembly rotatable from a down position in which a rear wheel contacts the ground to a storage position in which the rear wheel is positioned behind the rear wall.

In a further aspect of the present invention, there is presented a method of storing a shopping cart having a basket, comprising positioning the shopping cart adjacent a rear of a trunk vehicle; manipulating a handlebar of the shopping cart to rotate a front wheel assembly of the shopping cart so that wheels of the front wheel assembly are positioned adjacent or above a floor of a basket of the shopping cart; rotating a rear wheel assembly of the shopping cart so that wheels of the rear wheel assembly are positioned at or behind a rear wall of the basket; storing the shopping cart in the vehicle trunk; removing the shopping cart from the vehicle trunk and rotating the front and rear wheel assemblies so that they contact the ground; removing the contents of the basket; and collapsing sides of the basket and the rear wall and a front wall to the floor of the basket.

These and other features, aspects and advantages of the present invention will become better understood with reference to the following drawings, descriptions and claims.

BRIEF DESCRIPTION OF THE DRAWINGS

FIG. 1 is a left side perspective view of a shopping cart of the present invention;

FIG. 3D is a perspective view of the shopping cart of the present invention with the front and rear wheel assemblies in storage position and with the side walls and front walls folded and the rear wall partially folded;

FIG. 3E is a perspective view of the shopping cart of the present invention with the front and rear wheel assemblies in storage position and with the basket in storage position;

DETAILED DESCRIPTION OF THE INVENTION

Figure 1A:
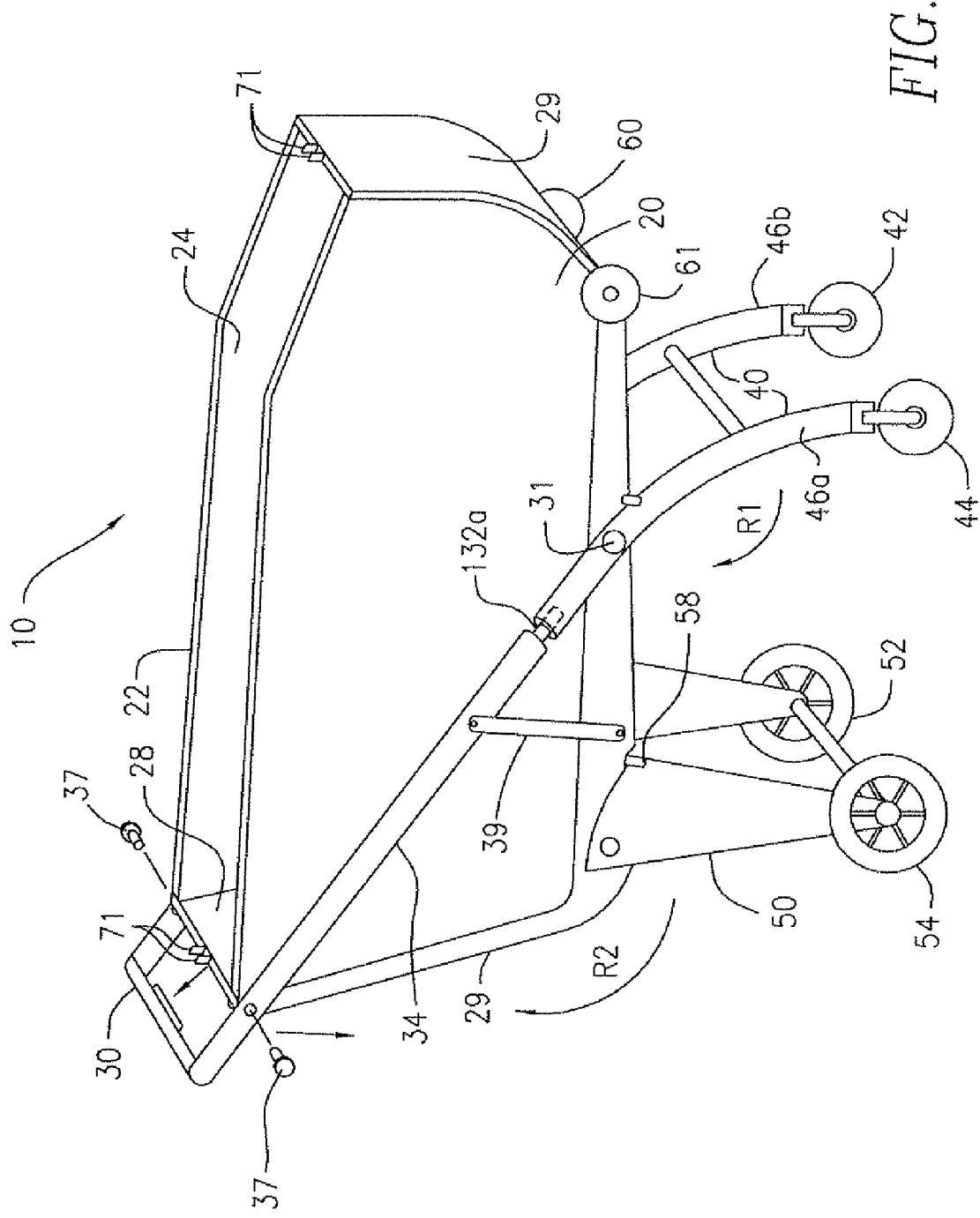
FIG. 1A is a right side perspective view of a shopping cart of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a collapsible shopping cart for easily transferring a large amount of groceries purchased and stored in a shopping cart into and out of a trunk of a car or other vehicle for transportation to the home. Specifically, it provides a shopping cart specially designed to easily fold into the trunk of a car or other vehicle and to fold further for later storage in a closet. The front wheels automatically fold up above the floor of the basket of the cart when the basket is slid into the trunk and the rear wheels can be rotated to behind the rear wall of the basket. After filling the contents on the shopping cart with purchased items, the cart is positioned adjacent the vehicle trunk. The front wheels may be unlocked and rotated up by a user manipulating the handlebar while standing in the ordinary position behind the shopping cart. Following that, or instead of that, by sliding the basket of the shopping cart across the rear of the vehicle trunk, the front wheel assembly can be rotated into a storage position. After further sliding of the basket into the car trunk, the rear wheel assembly can be rotated into a storage position. This can all be done without leaving the rear of the cart. The shopping cart can then be slid further until it sits into the bottom of the trunk of the vehicle. After arriving home, the steps of rotating the front and rear wheel assemblies may be reversed to end up with a shopping cart that is movable along the ground. After the shopping cart is emptied of its contents, the basket walls may be collapsed to store the cart in a closet at home standing against the wall.

In contrast to the prior art, in which the shopping cart has to be unloaded of its groceries item by item, the shopping cart of the present invention can transfer all groceries into a vehicle in one shot. In further contrast to the prior art, in which the shopping cart requires tremendous time and effort to transfer its contents into a vehicle, the shopping cart of the present invention may allow transfer of everything in the shopping cart basket, together with the cart itself, into the trunk of a vehicle in a few seconds and with only two or three motions. In further contrast to the prior art, in which containers carrying purchases may have to be stored on the roof of a car other vehicle, which requires heavy lifting, the shopping cart of the present invention may be used to transfer and load up a trunk of a vehicle without any strenuous movements. In still further contrast to prior art shopping carts which damage the rear of a vehicle when attempting to unload its contents into the vehicle trunk, the shopping cart of the present invention may include mini-wheels that facilitate sliding the basket into the trunk of the vehicle. In contrast to the prior art shopping carts which are bulky, the shopping cart of the present invention may be collapsed into a substantially two-dimensional form. In contrast to the prior art carts lacking locks on the front wheels (or rear wheels) thereby risking the front wheel assembly accidentally rotating up upon hitting a bump on the ground and causing the whole cart to fall with its contents, the shopping cart of the present invention may include locks for front and rear wheel assemblies. In further contrast to the prior art collapsible carts in which unlocking the front wheels requires moving from behind the cart to the front wheels, the shopping cart of the present invention allows the user to stand behind the shopping cart and unlock the front wheels in preparation for the rotation of the front wheels into storage position without the user having to move around the cart to the front of the cart to unlock the wheels.

Figure 1B:
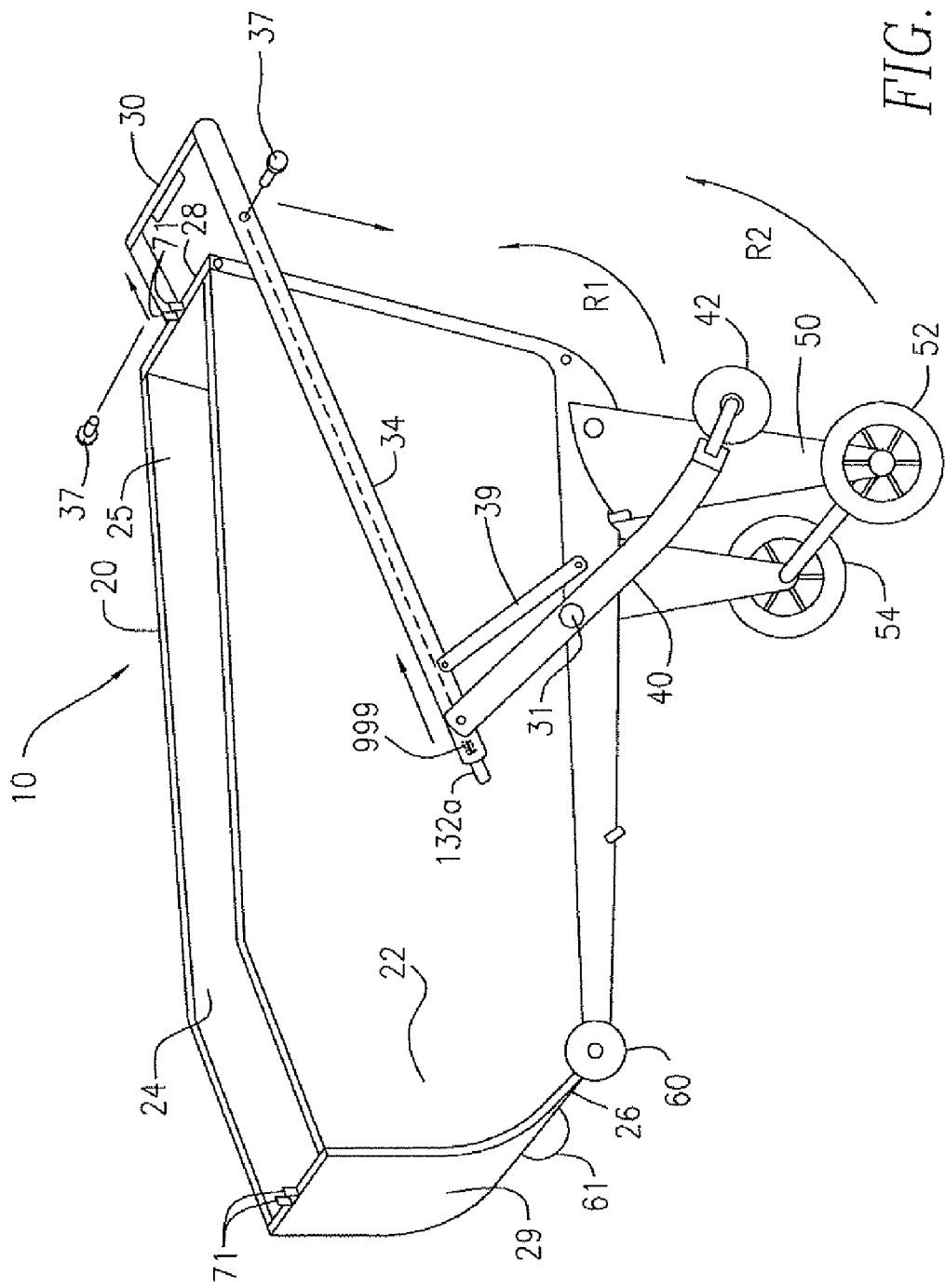
FIG. 1B is a left side perspective of the shopping cart of the present invention in a position where the handlebar has been squeezed and the front wheel assembly has been released and folded to a position under the basket.
Figure 1C:
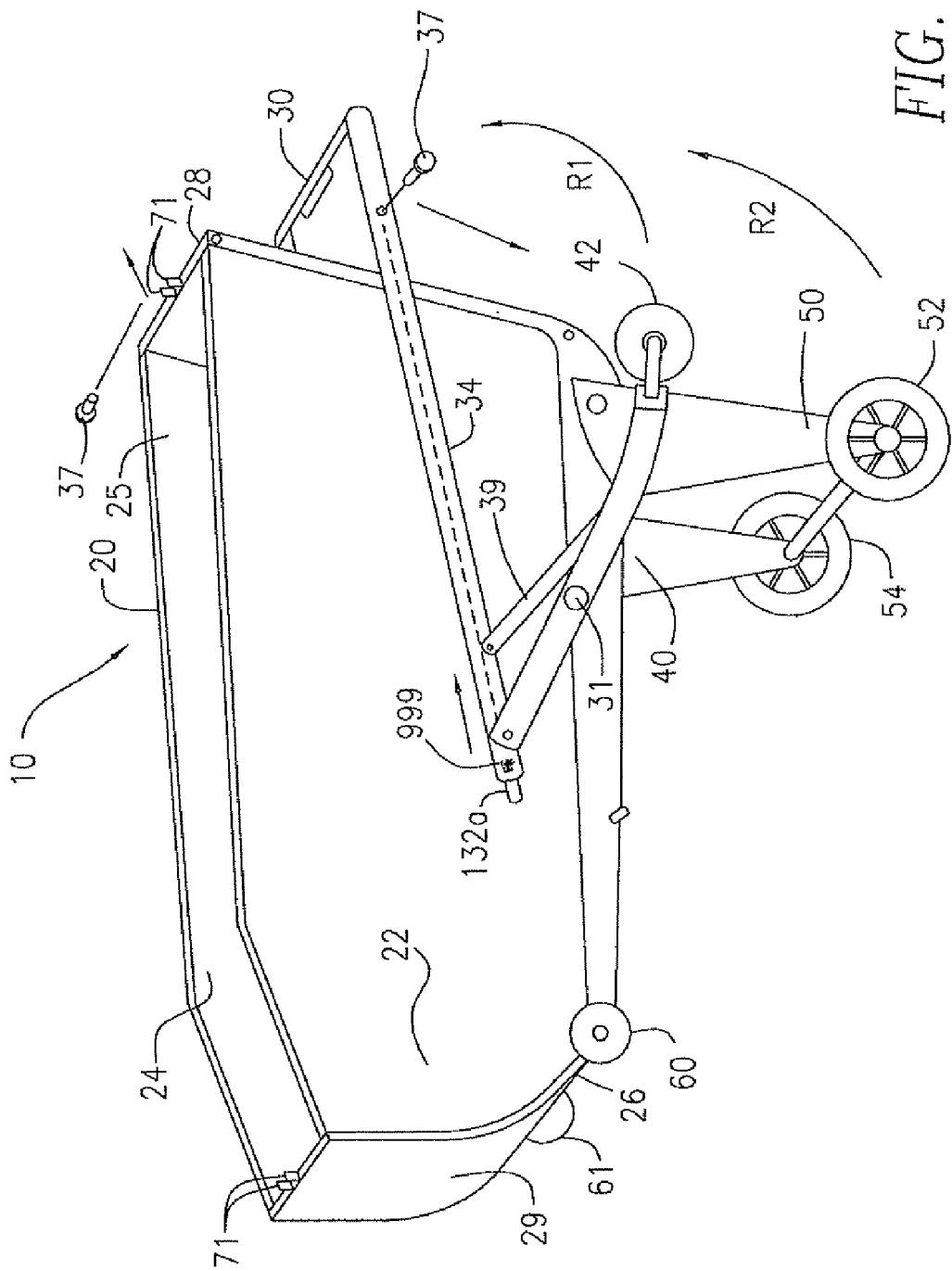
FIG. 1C is a left side perspective of the shopping cart of the present invention in a position where the handlebar has been squeezed and partially lowered and the front wheel assembly has been released and folded to a position under the basket.
Figure 2:
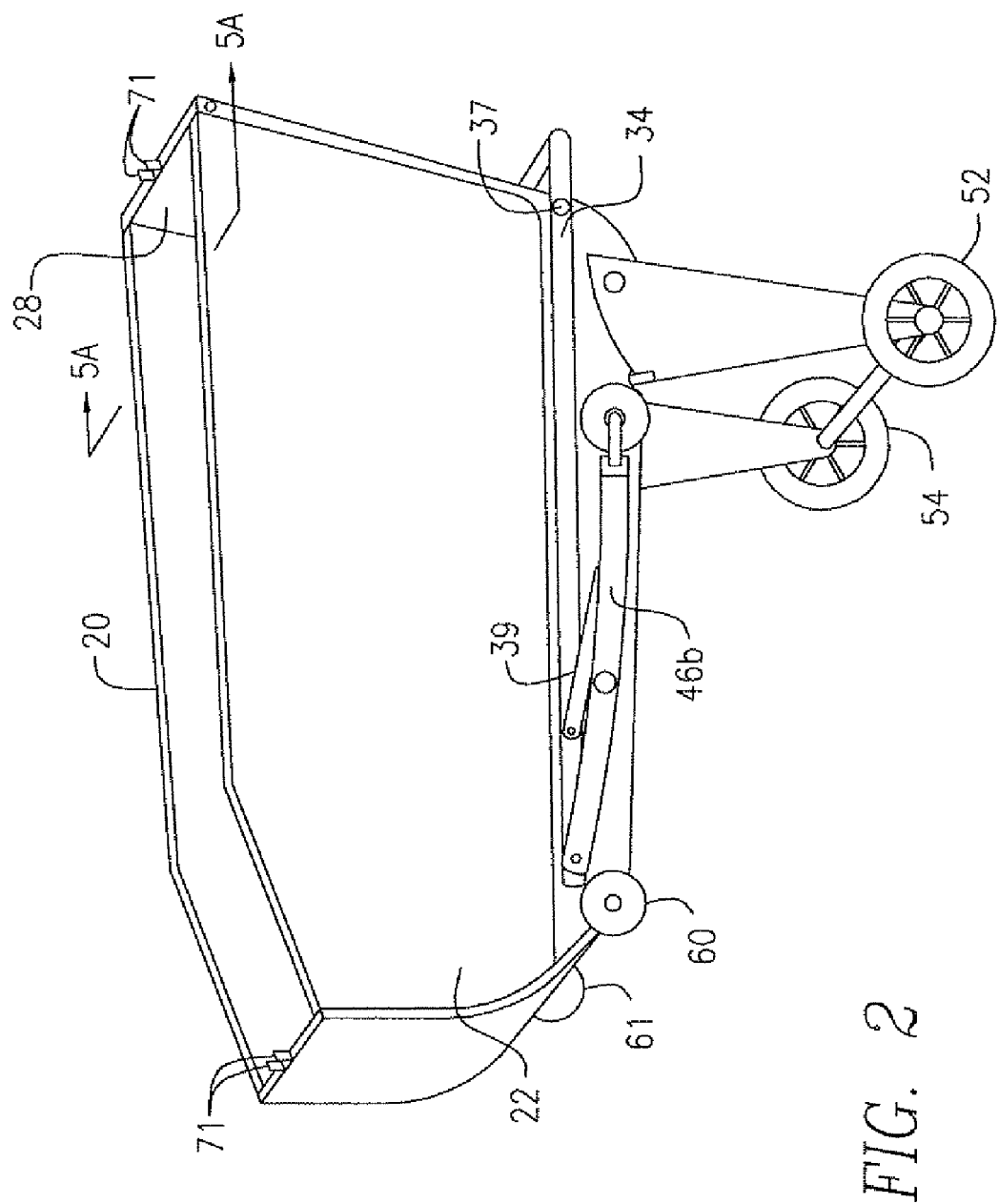
FIG. 2 is a perspective view of the shopping cart of the present invention with the front wheel assembly in storage position and the rear wheel assembly in down position.
Figure 2A:
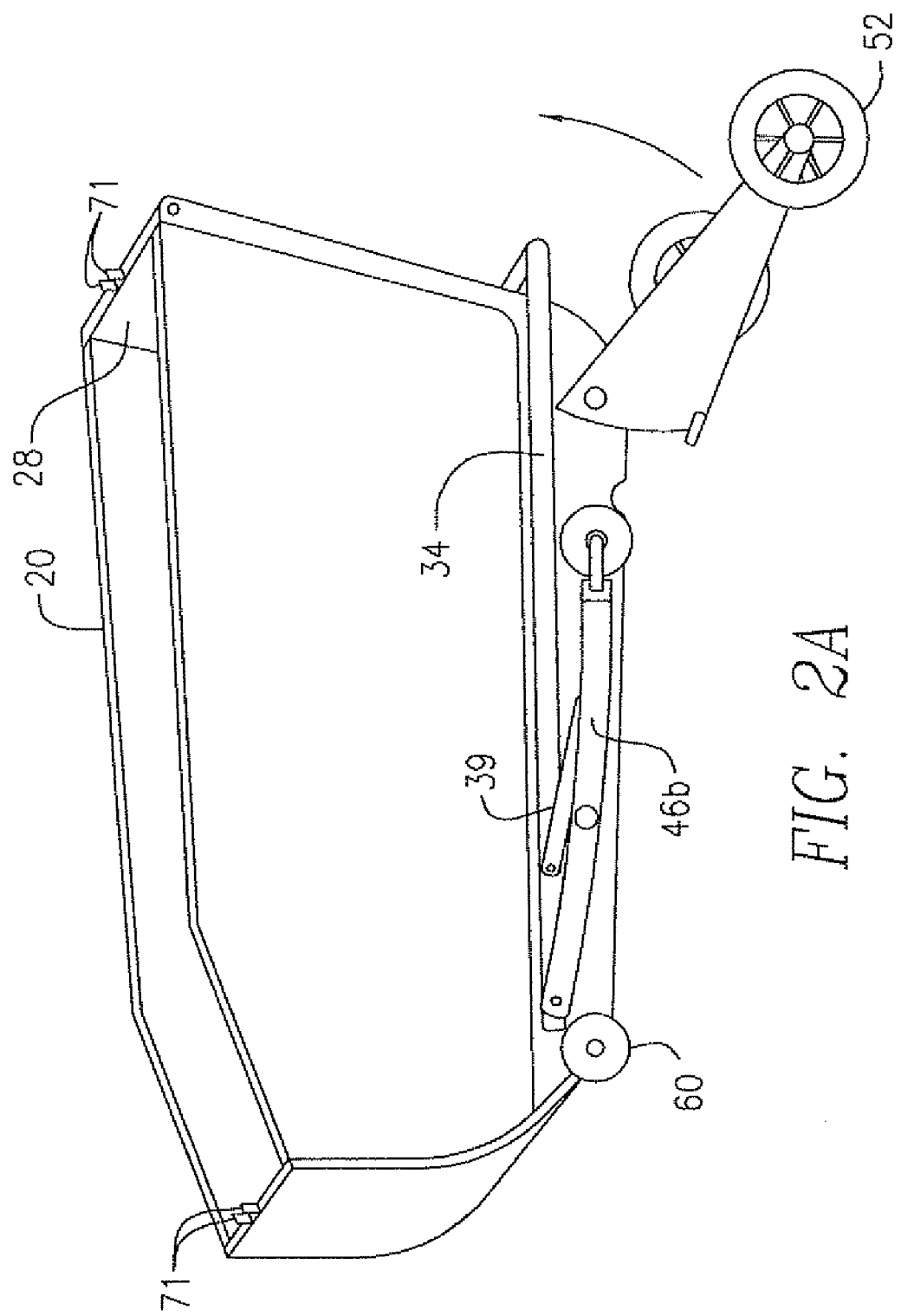
FIG. 2A is a perspective view of the shopping cart of the present invention with the front wheel assembly in storage position and the rear wheel assembly partially rotated towards storage position.

FIG. 1 shows a shopping cart 10 in accordance with the present invention including a basket 20. Basket 20 may have a left side 22, a right side 24, a floor 26, a rear wall 28 and a front wall 29. Handlebar 30 may be positioned behind and/or above rear wall 28. Shopping cart 10 may have a front wheel assembly 40 that may include a left front wheel 42 and a right front wheel 44. It is also possible in certain embodiments that front wheel assembly 40 has only one central front wheel (not shown) or even left front wheel 42 and not right front wheel 44 or vice versa. As shown by the arrow $R_1$ in FIG. 1, front wheel assembly 40 may be rotatable from a down position, as in FIG. 1, in which the front wheels 42, 44 contact the ground to a storage position, as shown in FIG. 2, in which the front wheels 42, 44 are positioned above the floor 26 of basket 20.

Front wheel assembly may be urged to rotate to the storage position in several different ways. For example, the rotation of front wheel assembly 40 may occur manually. Alternatively, the rotation of front wheel assembly 40 may be preceded by first releasing a lock 37 that locks the handlebar 30 into its position, as shown in FIG. 1, FIG. 1A and FIG. 1B. After releasing lock 37, rotation of front wheel assembly 40 may then occur in a number of ways. One way may involve squeezing handlebar 30. As seen from FIG. 4A, handlebar 30 may have a projecting member 130 such that squeezing handlebar 30 involves squeezing projecting member 130 to move an internal crossbar 131 of handlebar 30 toward a user. Internal crossbar 131 may be connected to at least one movable rod 132 of a right and/or left lever on a right and/or left side of the handlebar 30. Right and left levers 32, 34 may be connected to the front wheel assembly. Levers 32, 34 may be hollow and may have running therethrough a movable rod 132.

Figure 4A:
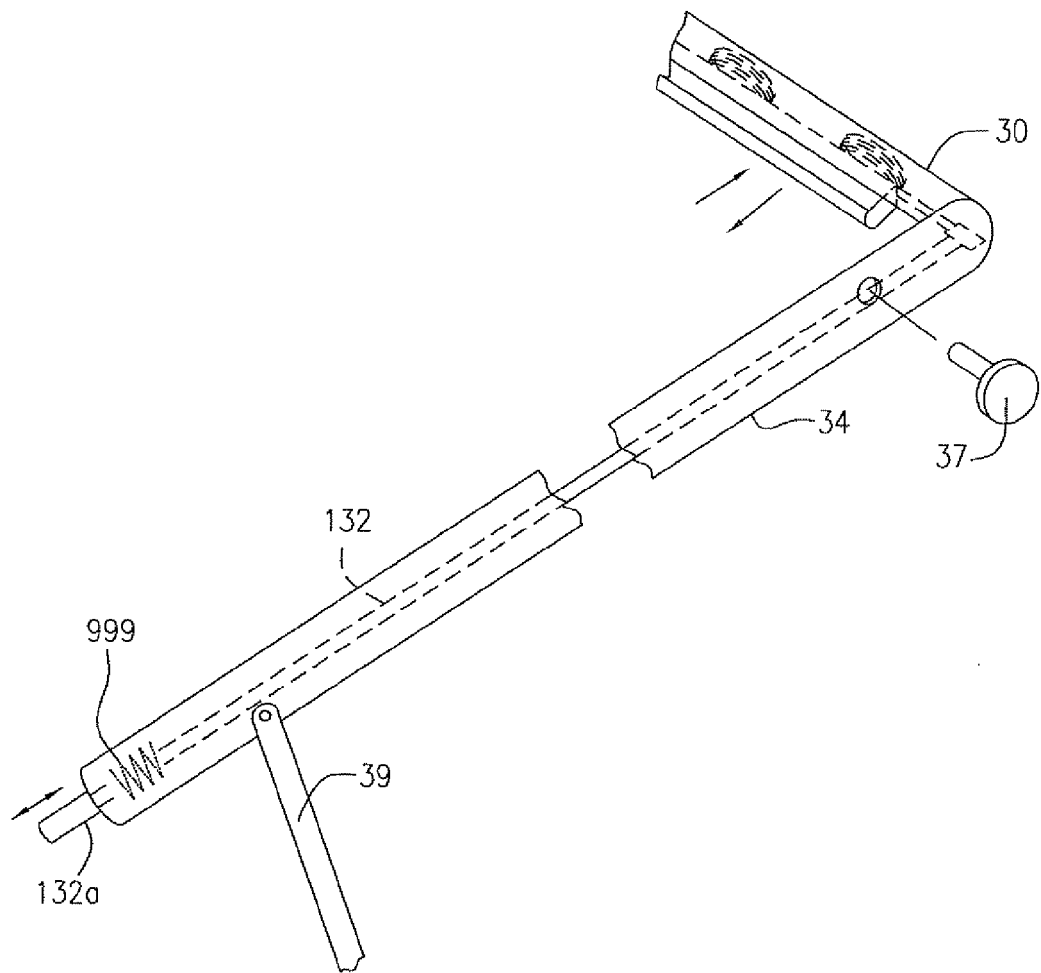
FIG. 4A is a fragmentary perspective view of the handlebar and a lever showing a mechanism for using the handlebar to help collapse the front wheel assembly in accordance with one embodiment.

As best seen from FIG. 113, the squeezing of handlebar 30 may thereby cause a left and/or right movable rod 132 within levers 32, 34 to be moved toward the user and away from front wheel assembly 40. Normally, that is when handlebar 30 is not squeezed, as seen from FIG. 1A, FIG. 1B and FIG. 1C, movable rod 132 or rods 132 block the rotation of levers 32, 34 by having its end piece 132a extend into a space at a top of right and/or left frame members 46a, 46b. Squeezing handlebar 30 may free levers 32, 34 for movement. Spring 999 adjacent end piece 132a may be used to aid this mechanism. FIG. 1A shows end piece 132a of movable rod 132 beginning to emerge from within right frame member 46a of front wheel assembly 40 when handlebar 30 is squeezed. FIG. 4A shows handlebar 30 having a squeezable portion 130 connected to a horizontal rod 131 that is in turn connected to movable rod 132 inside lever 34 in accordance with one embodiment.

After releasing the lock 37, the user may push handlebar 30 down and toward the user (as shown in progression in FIG. 1B, FIG. 1C and FIG. 2) to release front wheel assembly 40 and cause front wheel assembly 40 to pivot and rotate backwards on left and right frame fulcrums 31. Since left and right frame fulcrums may be affixed to floor 26 of basket 20, the rotation of front wheel assembly 40 may cause front wheel assembly 40 to finish its rotation and lock in at a position that may be above and/or alongside basket floor 26. Front wheel assembly 40 may also include right and left frame members that may be generally perpendicular to an axle connecting the wheels of front wheel assembly 40.

Furthermore, as seen from FIG. 1, shopping cart 10 may include an additional lock 37A connecting the left and right levers 32, 34 under basket 20 to provide for greater stability.

FIG. 1B generally shows the other side of cart 10 from FIG. 1A. Cart may have a baby seat (not shown) near the back of the basket 20. In FIG. 1B, the manner of flexing levers 32, 34 to rotate front wheel assembly 40 can be seen from rod 39 causing lever 34 to flex. The same thing may occur on the opposite side of basket 20 when handlebar 30 is manipulated.

Rear wall 28 may have projecting therefrom a lock (not shown) for locking the handlebar 30 after handlebar 30 has been moved downward and forward when rotating the front wheel assembly.

Figure 3:
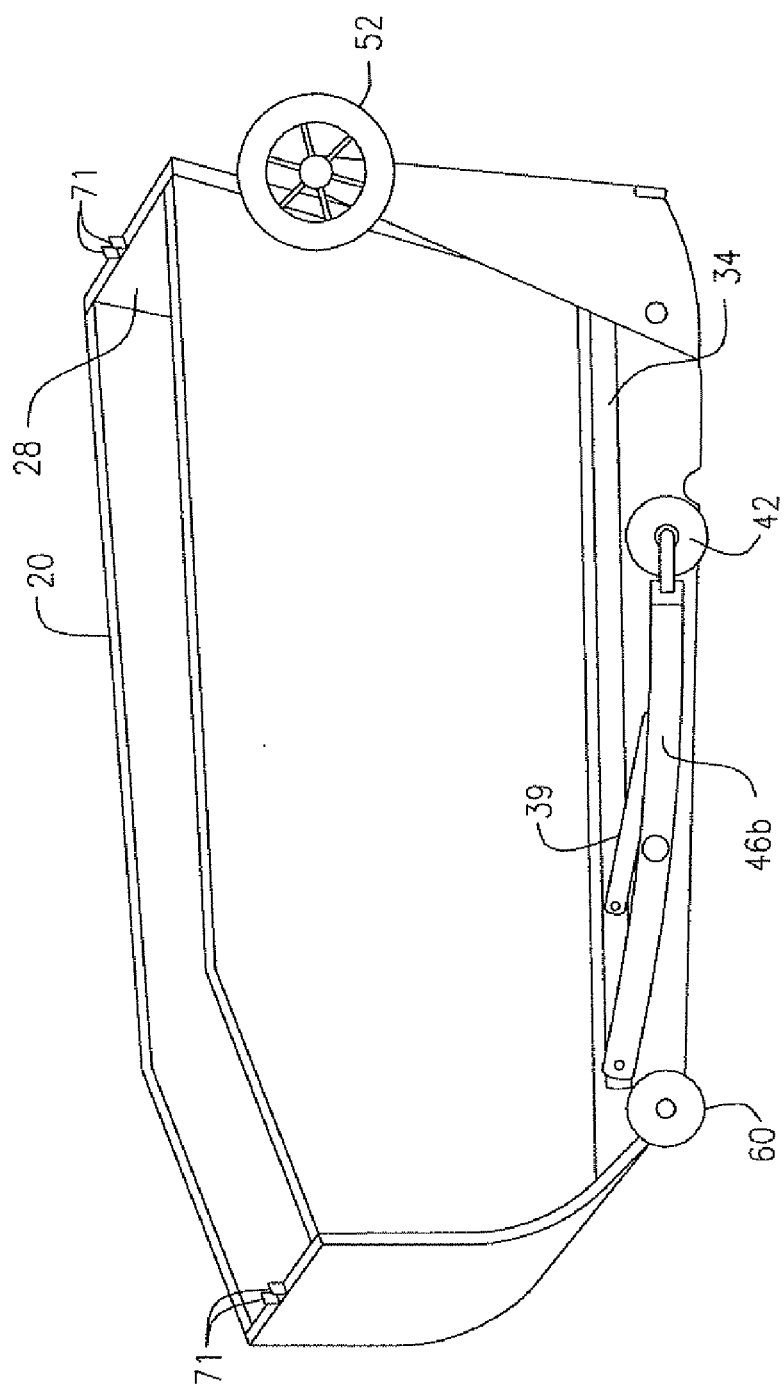
FIG. 3 is a perspective view of the shopping cart of the present invention with the front and rear wheel assemblies in storage position.

Shopping cart 10 may also have a rear wheel assembly 50 that may include a left rear wheel 52 and a right rear wheel 54. As shown by arrow $R_2$ in FIG. 1, rear wheel assembly 50 may be rotatable from a down position, as in FIG. 1, in which the rear wheels 52, 54 contact the ground to a storage position, as shown in FIG. 3, in which rear wheels 52, 54 are positioned behind the rear wall. Note that FIG. 3 also depicts front rear assembly 40 in storage position. As in regard to front wheel assembly 40, in certain embodiments rear wheel assembly 50 may have only one central rear wheel (not shown) or even left rear wheel 52 and not right rear wheel 54 or vice versa.

As seen in FIG. 1, rear wall 28 may be tapered so that a lower portion of the rear wall 28 may be closer to front wall 29 than an upper portion of rear wall 28. As further seen from FIG. 1, handlebar 30 may be connected to a right lever 32 on a right side of the handlebar 30 and to a left lever 34 on a left side of the handlebar, 30. Front wheel assembly 40 may include right frame member 46a and left frame member 46b that extend and connect to a forward end of the right and left levers respectively and that pivot on right and left frame fulcrums affixed to the basket. The right and left frame fulcrums are affixed to the floor of the basket. The rights and left frame members are generally perpendicular to an axle of the front wheel assembly.

Rear wheel assembly 50 may include right frame member 56a and left frame member 56b that may extend and connect to a side frame of basket 20 and that pivot on a left pivot point 59 and a right pivot point (not shown), as seen in FIG. 1 Left and right pivot points 59 may be two sliding pins, ends of a single axle or may be part of any other suitable pivoting mechanism.

Shopping cart 10 may also include a left wheel or mini-wheel 60, see FIGS. 1, 1A, 2, 3, and may include a similar right mini-wheel (not shown) that eases the sliding of shopping cart 10 into a rear portion 66 of the trunk 67 of a vehicle 68.

Figure 3A:
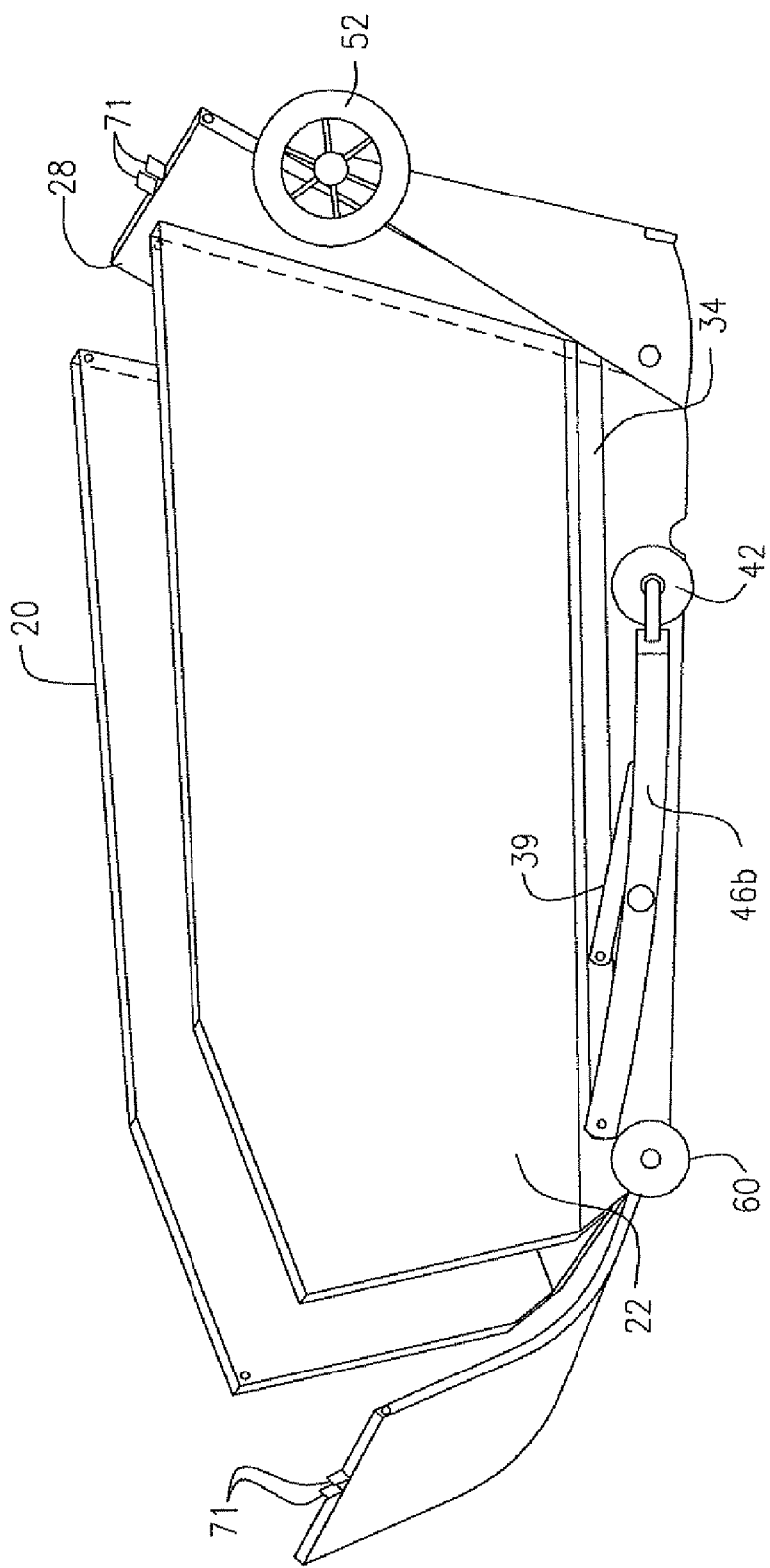
FIG. 3A is a perspective view of the shopping cart of the present invention with the front and rear wheel assemblies in storage position and with the side walls released for folding.
Figure 3B:
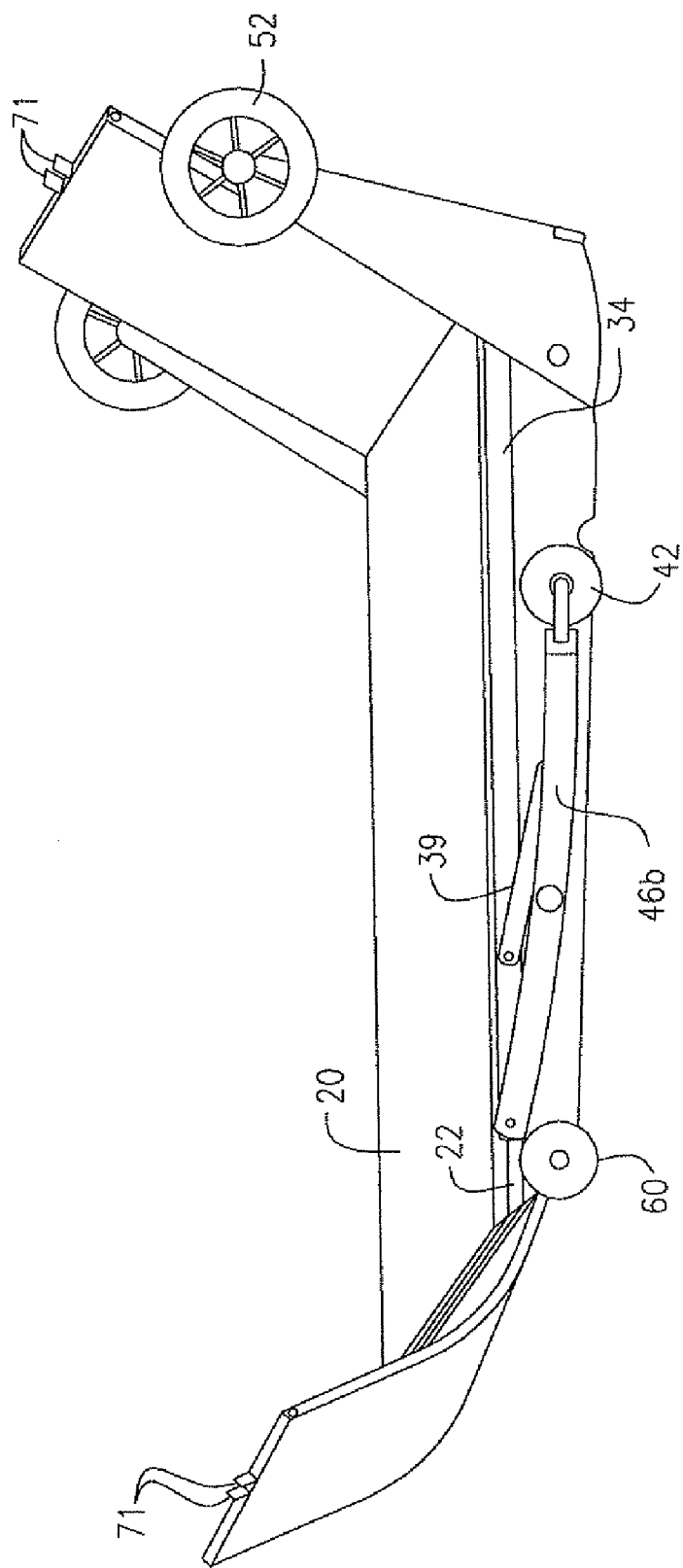
FIG. 3B is a perspective view of the shopping cart of the present invention with the front and rear wheel assemblies in storage position and with the side walls rotated into storage position at the floor of the basket.
Figure 3C:
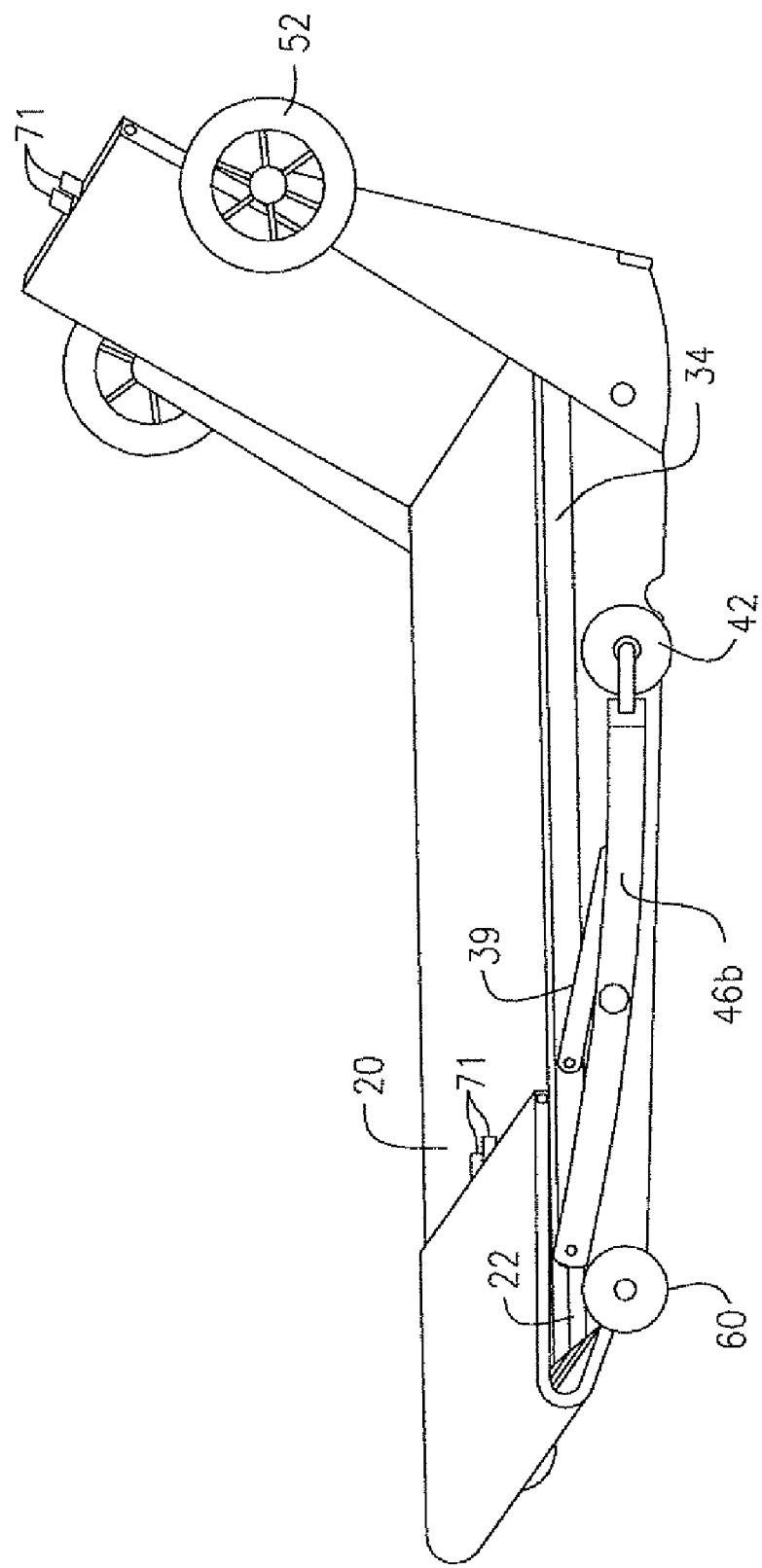
FIG. 3C is a perspective view of the shopping cart of the present invention with the front and rear wheel assemblies in storage position and with the side walls and front wall of the basket folded.

Shopping cart 10 may have a mechanism that allows further miniaturization of the storage space occupied by shopping cart 10. For example, cart 10 may include a mechanism for folding basket 20 into substantially planar form. FIGS. 3A through 3E show one particular way of folding the basket and show a progression of the folding of basket 20 into substantially planar form, which may occur after front wheel assembly 40 and rear wheel assembly 50 have been rotated into storage position. FIG. 3A is a perspective view of the shopping cart of the present invention with the front and rear wheel assemblies in storage position and with side walls 22, 24 released so that they can be rotated/folded downward toward floor 26 of basket 20. FIG. 3B shows the side walls rotated downward to the floor 26 of basket 20. FIG. 3C shows the front and rear wheel assemblies in storage position and with the side walls and front wall of the basket folded to the floor 26. FIG. 3D is a perspective view of the shopping cart of the present invention with the front and rear wheel assemblies in storage position and with the side walls and front walls folded and the rear wall partially folded. FIG. 3E shows the front and rear wheel assemblies in storage position and the basket in storage position in accordance with one particular embodiment.

Figure 5A:
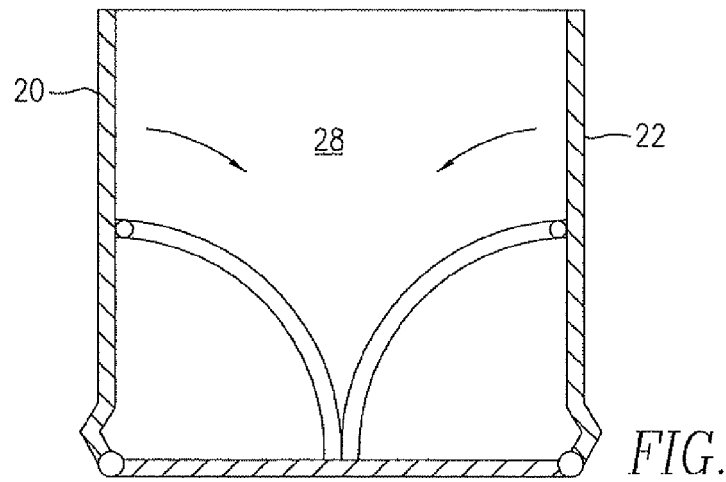
FIG. 5A is a partial sectional view from the rear of the side walls and floor of the basket of the shopping cart of the present invention showing one embodiment in which the side walls rotate along a track on the rear wall of the basket in order to fold into storage position.
Figure 5B:
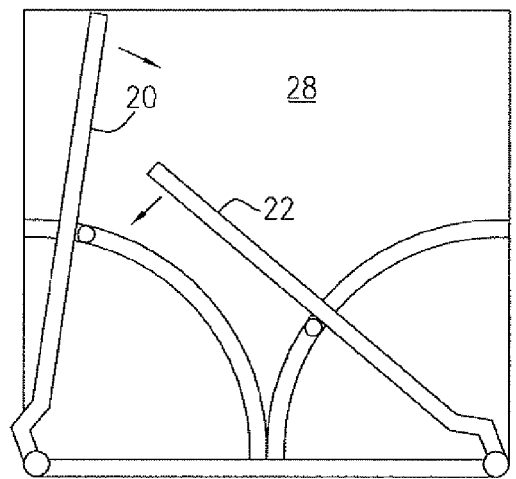
FIG. 5B is a plan view similar to FIG. 5A except with the side walls partially rotated along the track and except showing no partial section.
Figure 5C:
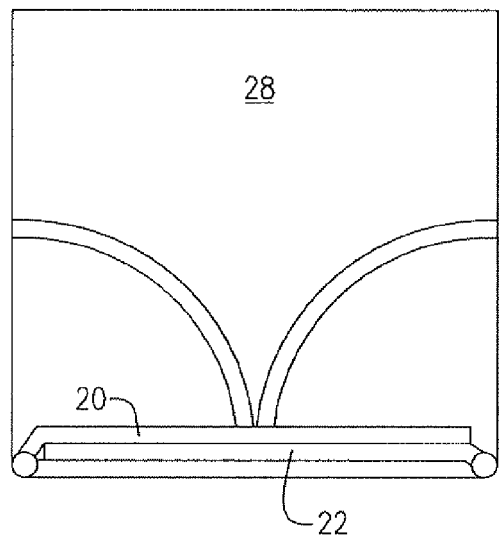
FIG. 5C is a view as in FIG. 5B except with the side walls fully rotated along the track into storage position.

In order to accomplish the folding of the walls of basket 20, in accordance with one particular embodiment, tracks may be provided. For example tracks may be provided attached to rear wall 28 as shown in FIG. 5A. FIG. 5A is a partial sectional view from the rear of the side walls and floor of the basket of the shopping cart of the present invention showing one embodiment in which the side walls rotate along a track on rear wall 28 of basket 20 in order to fold into storage position. FIG. 5B is a plan view similar to FIG. 5A except with the side walls partially rotated along the track and except showing no partial section. FIG. 5C is a view as in FIG. 5B except with the side walls fully rotated along the track into storage position.

Figure 5D:
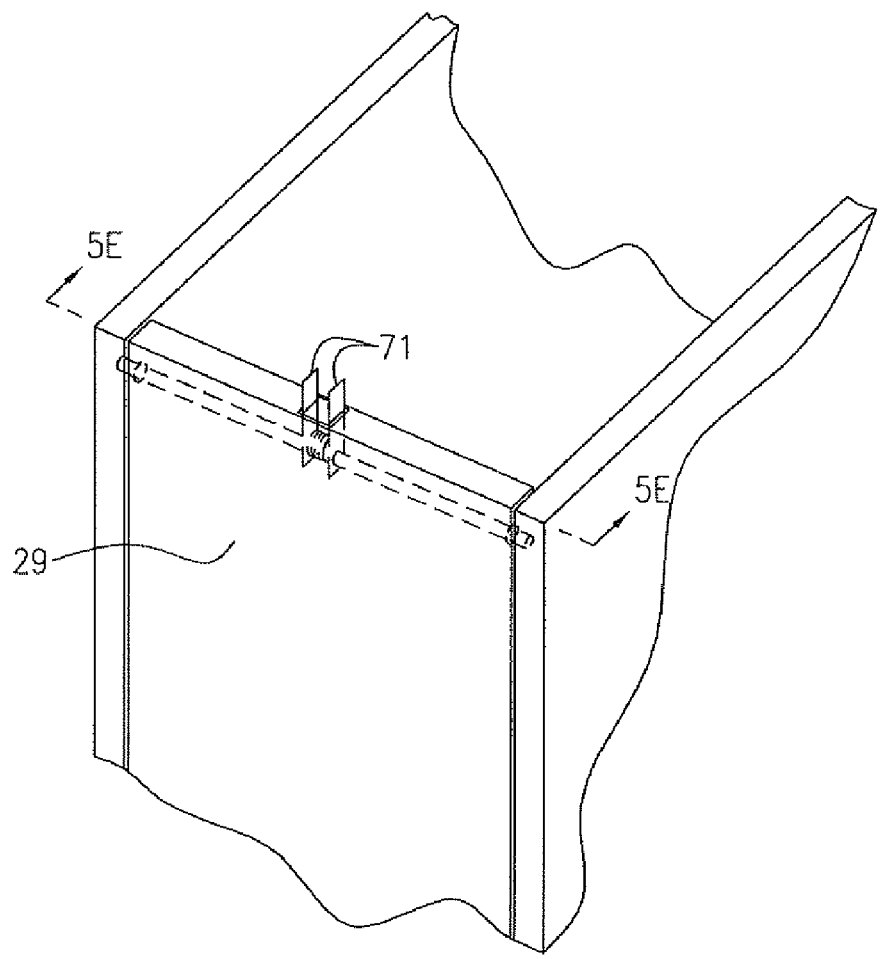
FIG. 5D is a perspective view of the front wall including a mechanism, in accordance with one particular embodiment, for releasing the front wall from attachment to the side walls of the basket to permit folding of the basket.
Figure 5E:
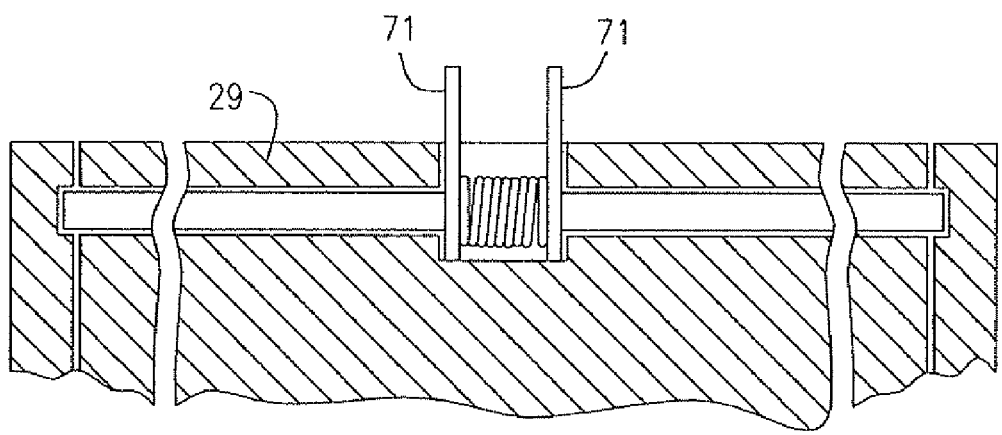
FIG. 5E is an enlarged sectional view of the mechanism shown in FIG. 5D in accordance with one particular embodiment of the present invention.

In accordance with one embodiment shown in detail in FIG. 5D and FIG. 5E, cart 10 may include a mechanism for releasably attaching front wall 29 to side walls 22, 24 of basket 20 to permit folding of basket 20.

Figure 6A:
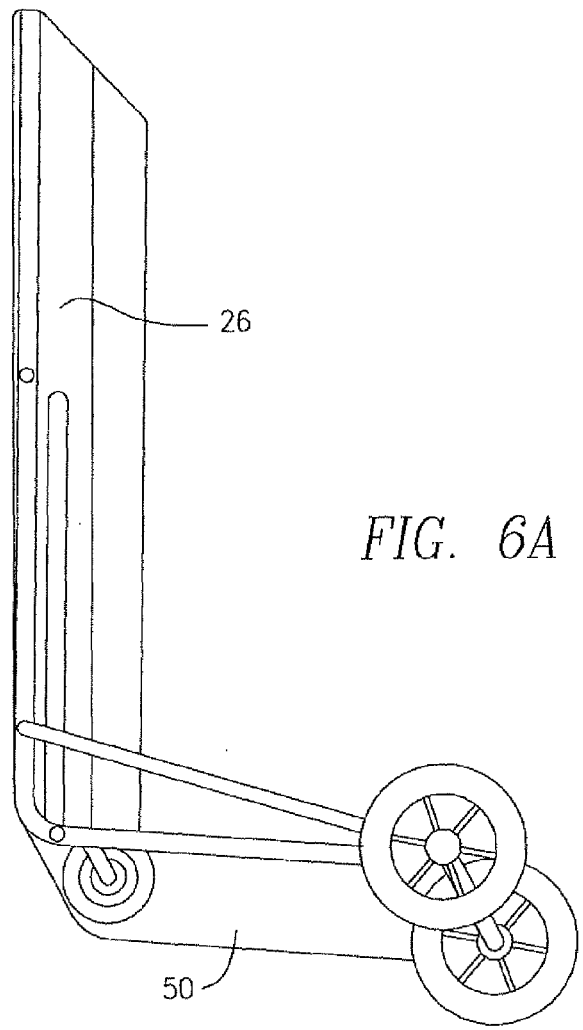
FIG. 6A is a perspective view of the collapsed shopping cart standing in storage position as it would be adjacent the wall and floor of a closet.
Figure 6B:
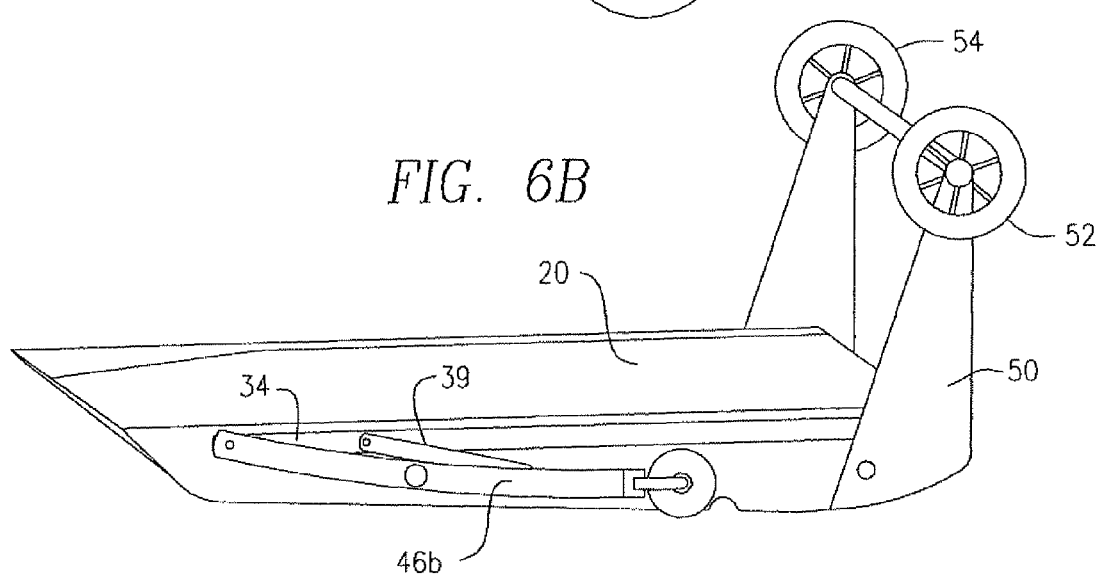
FIG. 6B is a perspective view of the collapsed shopping cart lying in storage position adjacent the wall and floor of a closet.
Figure 7:
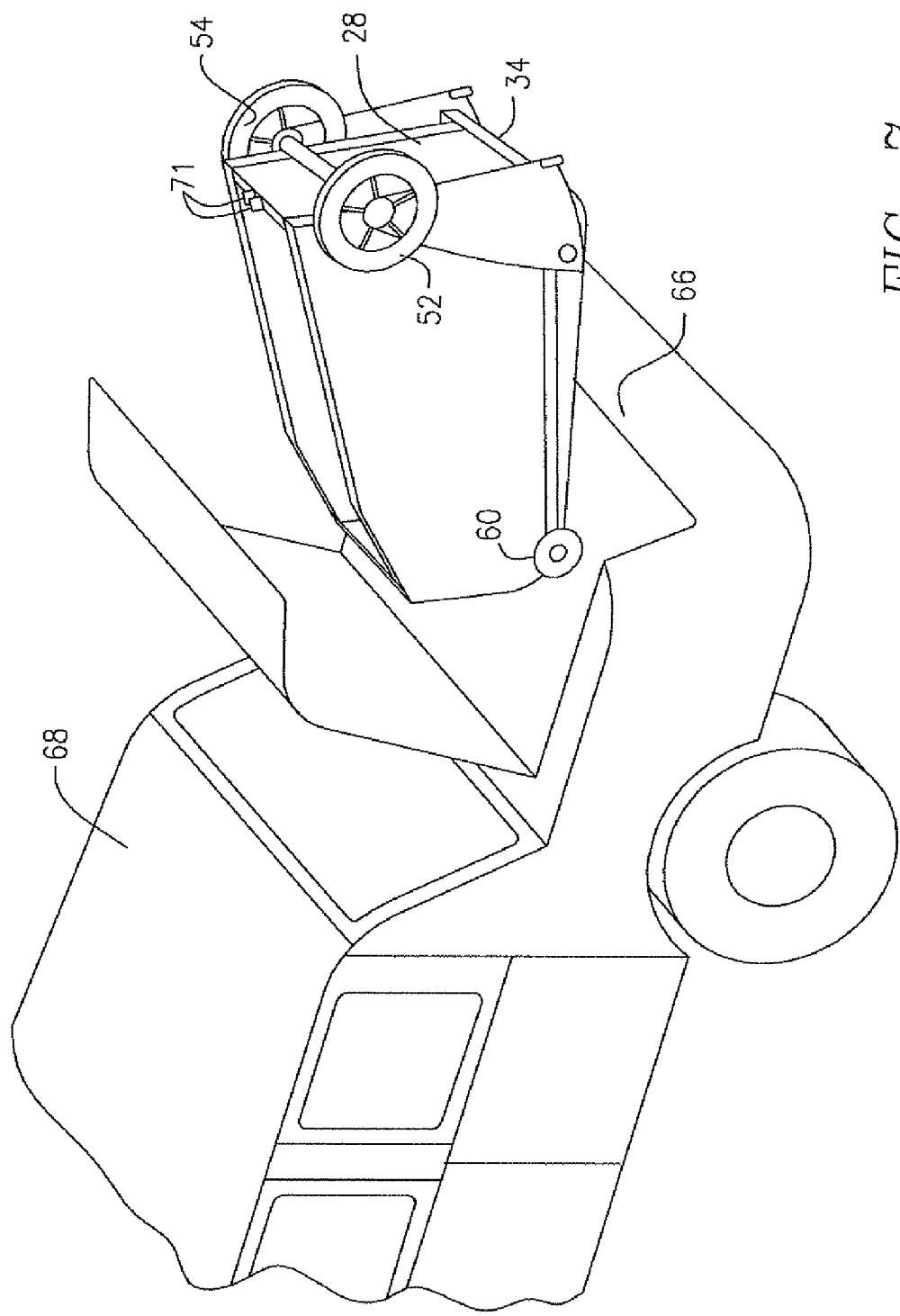
FIG. 7 is a fragmentary perspective view of a shopping cart, in accordance with one embodiment of the present invention, with front and rear wheel assemblies in storage position, being loaded into a vehicle trunk.
Figure 8:
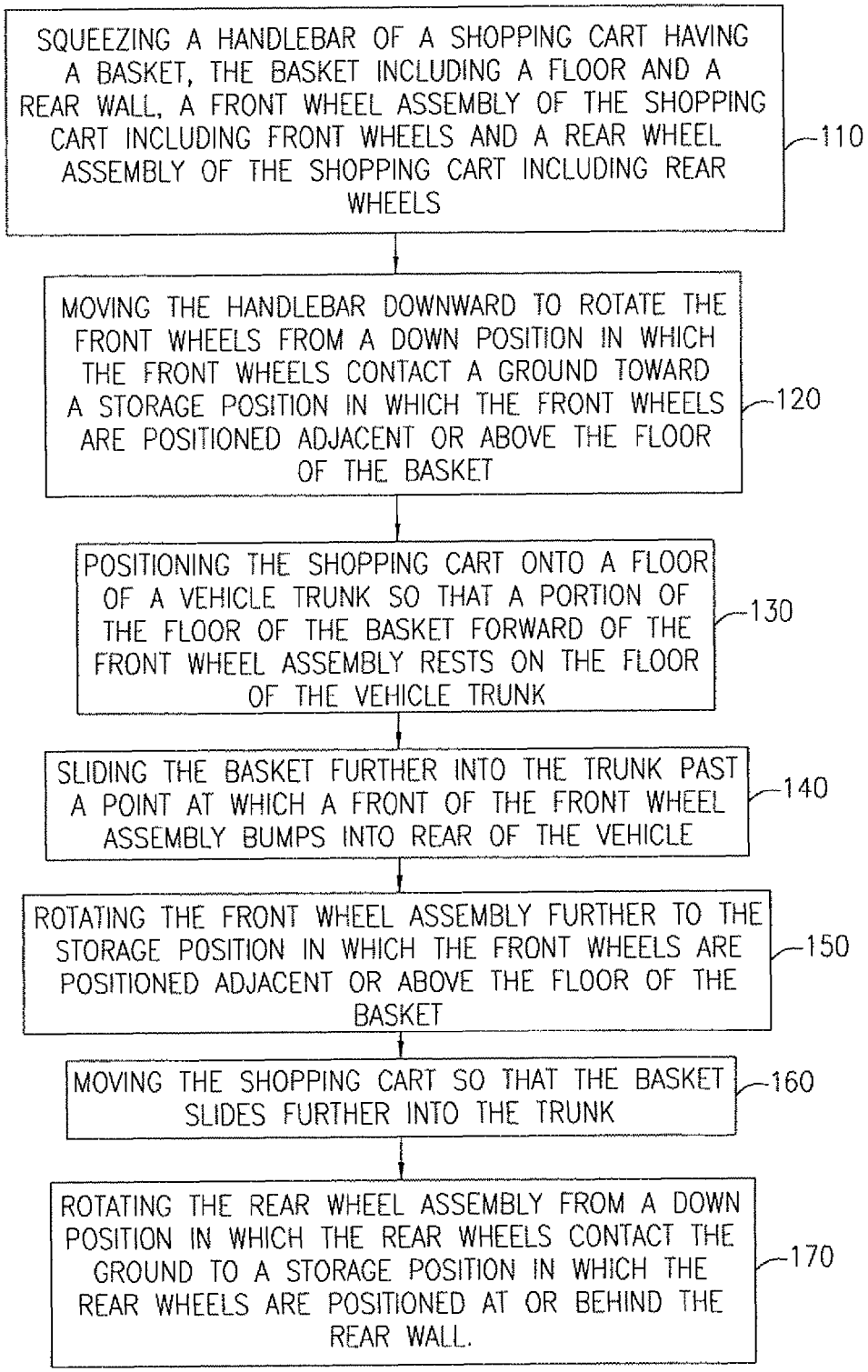
FIG. 8 is a flow chart showing a method of the present invention.
Figure 9:
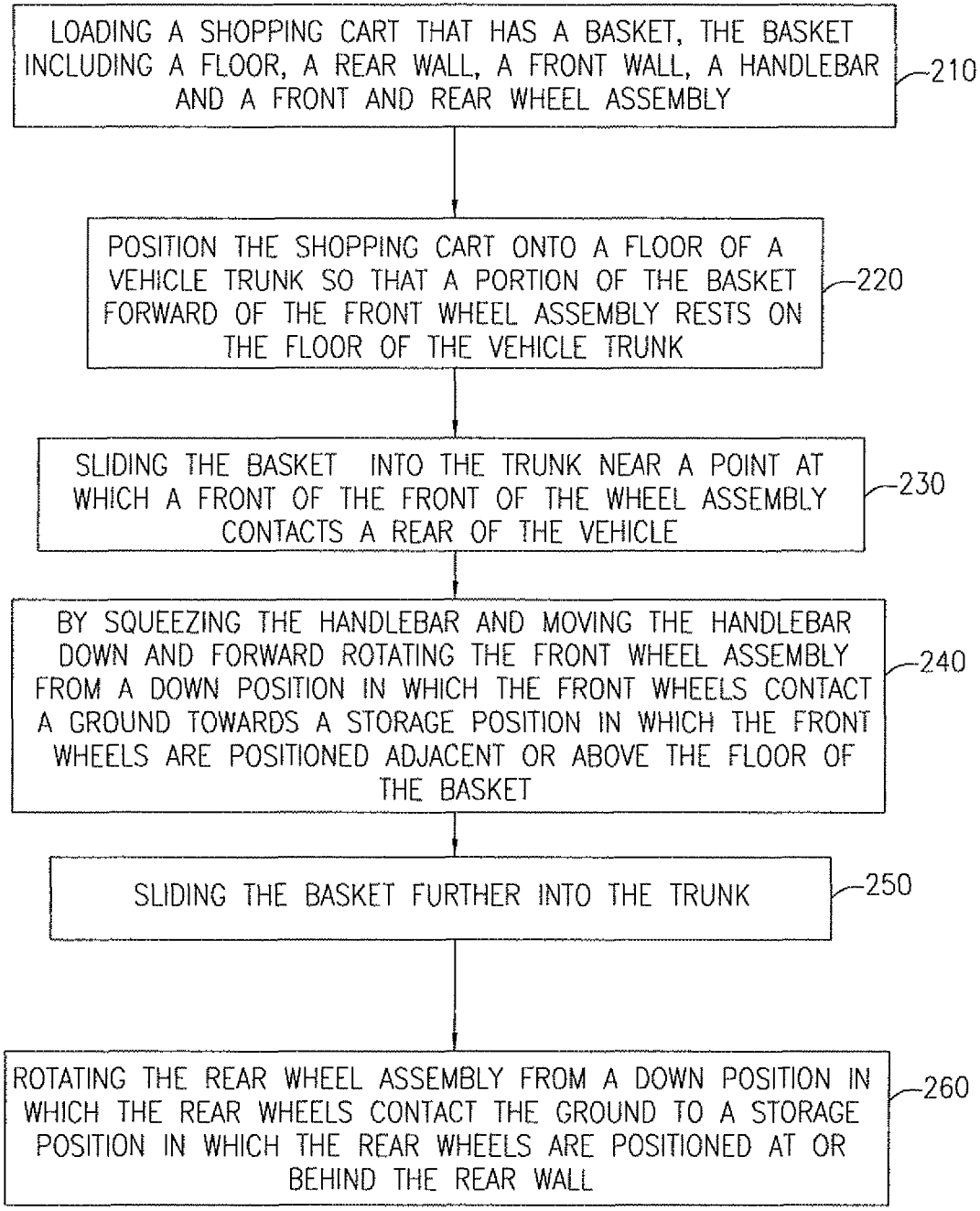
FIG. 9 is a flow chart showing a further method of the present invention.

Once shopping cart 10 is in fully stored position, it may be conveniently stored in a closet. For example, FIG. 6A is a perspective view of the collapsed shopping cart standing in storage position as it would be adjacent the wall and floor of a closet and FIG. 6B is a perspective view of the collapsed shopping cart lying in storage position adjacent the wall and floor of a closet.

The present invention may also be characterized as a method 100 comprising several steps. Method 100 may include a step 110 of squeezing a handlebar of a shopping cart that has a basket, the basket including at least a floor and a rear wall, a front wheel assembly of the shopping cart including front wheels and a rear wheel assembly of the shopping cart including rear wheels. Furthermore, method 100 may further include a step 120 of moving the handlebar downward to rotate the front wheels from a down position in which the front wheels contact the ground toward a storage position in which the front wheels are positioned adjacent or above the floor of the basket. Method 100 may include step 130 of positioning the shopping cart onto a floor of a vehicle trunk so that a portion of the floor of the basket forward of the front wheel assembly rests on the floor of the vehicle trunk. Method 100 may also include a step 140 of sliding the basket further into the trunk past a point at which a front of the front wheel assembly bumps into a rear of the vehicle. The sliding of basket 20 in step 130 may be facilitated by the presence of one or more mini-wheels, such as left mini-wheel 60 and right mini-wheel 61 along or adjacent the line where floor 26 of basket 20 meets front wall 29 of basket 20. Mini-wheels 60, 61 may contact a rear surface of rear 66 of trunk 67 or may contact another portion of the vehicle trunk 67.

Further, method 100 may include a step 150 of rotating the front wheel assembly from a down position in which the front wheels contact a ground to a storage position in which the front wheels are positioned above the floor of the basket; This would result in the shopping cart 10 being in the position depicted in FIG. 2. One way of accomplishing this may involve allowing the momentum of the sliding of the basket into the vehicle trunk past the point at which the front of the front wheel assembly contacts the rear of the vehicle to urge or force the rotation of the front wheel assembly from the down position to the storage position. Alternatively, the user may halt the sliding prior to the front of the front wheel assembly bumping into the car trunk and then the user may simply manually rotate the front wheel assembly.

Method 100 may include a still further step 160 of moving the shopping cart so that the baskets slides further into the trunk. This may be accomplished by moving the shopping cart until a front of the rear wheel assembly contacts the rear of the vehicle. Method 100 may include a further step 170 of rotating the rear wheel assembly from a down position in which the rear wheels contact the ground to a storage position in which the rear wheels are positioned behind the rear wall. This may result in the shopping cart being in the position depicted in FIG. 3. After reaching home or another destination, the user may pull the shopping cart towards himself and then may rotate the rear wheel assembly back down into the position where the rear wheels can touch the ground. The user may then move the front wheels back down. Moving the front wheels back down may occur manually and involve a preliminary step of first releasing a lock. The lock may be controlled by the handlebar of the shopping cart. After releasing the lock, the handlebar may be manipulated towards the user and in an upward motion, which are the opposite movements of those used to rotate the front wheel assembly into storage position previously.

The present invention may also be characterized as a method 200 that includes a step 210 of loading a shopping cart that has a basket that includes a floor, a rear wall, a front wall, a handlebar and a front and rear wheel assembly. Further the method 200 may include a step 220 of positioning the shopping cart onto a floor of a vehicle trunk so that a portion of the floor of the basket forward of the front wheel assembly rests on the floor of the vehicle trunk. In addition, method 200 may include a step 230 of sliding the basket into the trunk near a point at which a front of the front wheel assembly contacts a rear of the vehicle. Method 200 may include a step 240 of rotating the front wheel assembly from a down position in which the front wheels contact a ground to a storage position in which the front wheels are positioned above the floor of the basket. Step 240 may be accomplished by squeezing the handlebar and/or by moving the handlebar down and forward. The squeezing of the handlebar may release a lock on the front wheel assembly. Moving the handlebar down and forward may cause front wheel assembly frame members to pivot and rotate.

Method 200 may include step 250 of sliding the basket further into the trunk and step 260 of rotating the rear wheel assembly from a down position in which the rear wheels contact the ground to a storage position in which the rear wheels are positioned behind the rear wall. After this is done, the user may finish sliding the cart into the trunk so that it is totally stored inside the trunk of the vehicle. With the front and rear assemblies rotated, shopping cart 10 may fit into a trunk of a vehicle entirely, limited mainly by the dimensions of basket 20.

It should be understood, of course, that the foregoing relates to exemplary embodiments of the invention and that modifications may be made without departing from the spirit and scope of the invention as set forth in the following claims.

I claim:

1. A method, comprising:
   squeezing a handlebar of a shopping cart having a basket, the basket including a floor and a rear wall, a front wheel assembly of the shopping cart including front wheels and a rear wheel assembly of the shopping cart including rear wheels;
   moving the handlebar downward to rotate the front wheels from a down position in which the front wheels contact a ground toward a storage position in which the front wheels are positioned adjacent or above the floor of the basket;
   positioning the shopping cart onto a floor of a vehicle trunk so that a portion of the floor of the basket forward of the front wheel assembly rests on the floor of the vehicle trunk;
   sliding the basket further into the trunk past a point at which a front of the front wheel assembly bumps into a rear of the vehicle;

rotating the front wheel assembly further to the storage position in which the front wheels are positioned adjacent or above the floor of the basket;

moving the shopping cart so that the baskets slides further into the trunk; and rotating the rear wheel assembly from a down position in which the rear wheels contact the ground to a storage position in which the rear wheels are positioned at or behind the rear wall.

2. The method of claim 1, wherein moving the shopping cart so that the basket slides further into the trunk involves moving the shopping cart until a front of the rear wheel assembly contacts the rear of the vehicle.

3. The method of claim 1, wherein a momentum of the sliding of the basket into the vehicle trunk past the point at which the front of the front wheel assembly contacts the rear of the vehicle urges the rotation of the front wheel assembly from the down position to the storage position.

4. A method, comprising:

loading a shopping cart that has a basket that includes a floor, a rear wall, a front wall, a handlebar, a front wheel assembly that includes front wheels and a rear wheel assembly that includes rear wheels;

positioning the shopping cart onto a floor of a vehicle trunk so that a portion of the floor of the basket forward of the front wheel assembly rests on the floor of the vehicle trunk;

sliding the basket into the trunk near a point at which a front of the front wheel assembly contacts a rear of the vehicle;

by squeezing the handlebar and moving the handlebar down and forward rotating the front wheel assembly from a down position in which the front wheels contact a ground towards a storage position in which the front wheels are positioned adjacent or above the floor of the basket;

sliding the basket further into the trunk; and rotating the rear wheel assembly from a down position in which the rear wheels contact the ground to a storage position in which the rear wheels are positioned at or behind the rear wall.

5. The method of claim 4, further comprising storing the entire shopping cart in the trunk of the vehicle.

6. The method of claim 4, further comprising collapsing the basket so that the basket has a further reduced overall thickness.

* * * * *